United States Patent
Katagiri

(10) Patent No.: US 9,749,987 B2
(45) Date of Patent: Aug. 29, 2017

(54) MOBILE COMMUNICATION METHOD AND RADIO BASE STATION

(71) Applicant: KYOCERA CORPORATION, Kyoto (JP)

(72) Inventor: Shingo Katagiri, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/191,655

(22) Filed: Jun. 24, 2016

(65) Prior Publication Data

US 2016/0309446 A1    Oct. 20, 2016

Related U.S. Application Data

(63) Continuation of application No. PCT/JP2014/083694, filed on Dec. 19, 2014.

(30) Foreign Application Priority Data

Dec. 24, 2013   (JP) ................. 2013-266172

(51) Int. Cl.

| H04W 4/14 | (2009.01) |
|---|---|
| H04W 68/00 | (2009.01) |
| H04W 52/02 | (2009.01) |
| H04W 68/02 | (2009.01) |
| H04W 76/04 | (2009.01) |

(52) U.S. Cl.
CPC ..... *H04W 68/005* (2013.01); *H04W 52/0216* (2013.01); *H04W 52/0219* (2013.01); *H04W 68/025* (2013.01); *H04W 76/048* (2013.01); *Y02B 60/50* (2013.01)

(58) Field of Classification Search
CPC ............. H04W 76/048; H04W 68/005; H04W 72/0446; H04W 72/005; H04W 56/0015; H04W 72/085; H04W 76/046; H04W 52/0225; H04W 68/02; H04W 60/04; H04W 52/0274; H04L 41/0672
USPC ........... 370/336, 331, 328; 455/67.13, 67.11, 455/436
See application file for complete search history.

(56) References Cited

U.S. PATENT DOCUMENTS

| 5,301,225 A | 4/1994 | Suzuki et al. |
| 2011/0319032 A1* | 12/2011 | Pica ............. H04W 24/10 455/67.13 |

(Continued)

FOREIGN PATENT DOCUMENTS

| JP | 05-183487 | 7/1993 |
| JP | 2012-124603 A | 6/2012 |
| WO | 2013141336 A1 | 9/2013 |

OTHER PUBLICATIONS

3GPP TS 36321 V10.0.0 (Dec. 2010), "3rd Generation Partnership Project; Technical Specification Group Radio Access Network; Evolved Universal Terrestrial Radio Access (E-UTRA); Medium Access Control (MAC) protocol specification (Release 10)," 53 pp.

(Continued)

*Primary Examiner* — Phuoc H Doan
(74) *Attorney, Agent, or Firm* — Studebaker & Brackett PC

(57) ABSTRACT

A mobile communication method comprises allocating, by the radio base station, the respectively different paging cycles, to a plurality of radio terminals that are present in an area covered by the radio base station.

6 Claims, 7 Drawing Sheets

(56) References Cited

U.S. PATENT DOCUMENTS

2013/0203455 A1    8/2013  Takano
2014/0146795 A1*   5/2014  Tian ..................... H04W 68/02
                                                     370/336

OTHER PUBLICATIONS

International Search Report from corresponding PCT/JP2014/083694, dated Feb. 17, 2015, 2 pp.
Written Opinion from corresponding PCT/JP2014/083694, dated Feb. 17, 2015, 4 pp.

* cited by examiner

MOBILE COMMUNICATION METHOD AND RADIO BASE STATION

TECHNICAL FIELD

The present invention relates to a mobile communication method and a radio base station used in a mobile communication system that configures a DRX cycle having a monitoring duration in which a downlink signal is monitored and a non-monitoring duration in which the downlink signal is not monitored.

BACKGROUND ART

Conventionally, there has been known a mobile communication system that adopts a DRX (Discontinuous Reception) setting a duration in which a radio terminal monitors a downlink signal transmitted from a radio base station (hereinafter, referred to as "monitoring duration") and a duration in which the radio terminal does not monitor the downlink signal transmitted from the radio base station (hereinafter, referred to as "non-monitoring duration") (for example, Non Patent Literature 1). For example, as such a mobile communication system, LTE (Long Term Evolution) has been known.

The same DRX cycle is used in a cell managed by the radio base station. It is noted that as the DRX cycle configured by the monitoring duration and the non-monitoring duration, cycles of 0.32 seconds, 0.64 seconds, 1.28 seconds, and 2.56 seconds are defined.

Here, an opportunity in which the downlink signal (here, a paging signal) is transmitted from the radio base station to the radio terminal is allocated to match the above-described monitoring duration. That is, a paging cycle allocated with the opportunity in which the paging signal is transmitted is similar to the DRX cycle.

Incidentally, when the same DRX cycle (paging cycle) is used in the cell managed by the radio base station, the radio terminal is not capable of knowing in which monitoring duration the paging signal destined to the radio terminal is transmitted, and thus, even when the opportunity in which the paging signal destined to the radio terminal is transmitted is less than that of another radio terminal, it is necessary to monitor the paging signal destined to the radio terminal in all the monitoring durations.

Therefore, when the same DRX cycle (paging cycle) is used in the cell managed by the radio base station, it is not possible to sufficiently reduce a power consumption of the radio terminal having less communication opportunities.

CITATION LIST

Non Patent Literature

[NPL 1] TS36.321 V10.0.0

SUMMARY OF INVENTION

A first aspect is a mobile communication method in which a radio base station allocates a paging cycle that is a cycle in which a radio terminal monitors a paging signal transmitted from the radio base station, to a radio terminal that is present in an area covered by the radio base station, comprises allocating, by the radio base station, the respectively different paging cycles, to a plurality of radio terminals that are present in an area covered by the radio base station.

A second aspect is a radio base station that allocates a paging cycle that is a cycle in which a radio terminal monitors a paging signal transmitted from the radio base station, to a radio terminal that is present in an area covered by the radio base station, comprises a controller configured to allocate the respectively different paging cycles, to a plurality of radio terminals that are present in an area covered by the radio base station.

DESCRIPTION OF EMBODIMENTS

A mobile communication system according to embodiments is described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Overview of Embodiments

A mobile communication method according to embodiments is a method in which a radio base station allocates a paging cycle that is a cycle in which a radio terminal monitors a paging signal transmitted from the radio base station, to a radio terminal that is present in an area covered by the radio base station. The mobile communication method comprises allocating, by the radio base station, the respectively different paging cycles, to a plurality of radio terminals that are present in an area covered by the radio base station.

In an embodiment, the radio base station allocates a respectively different paging cycle to the radio terminals that are present in an area covered by the radio base station. In other words, there is no need of using the same DRX cycle (paging cycle) in the cell managed by the radio base station, it is possible to sufficiently reduce a power consumption of the radio terminal having less opportunities in which the paging signal destined to the radio terminal is transmitted.

First Embodiment (Mobile Communication System)

Figure 1:
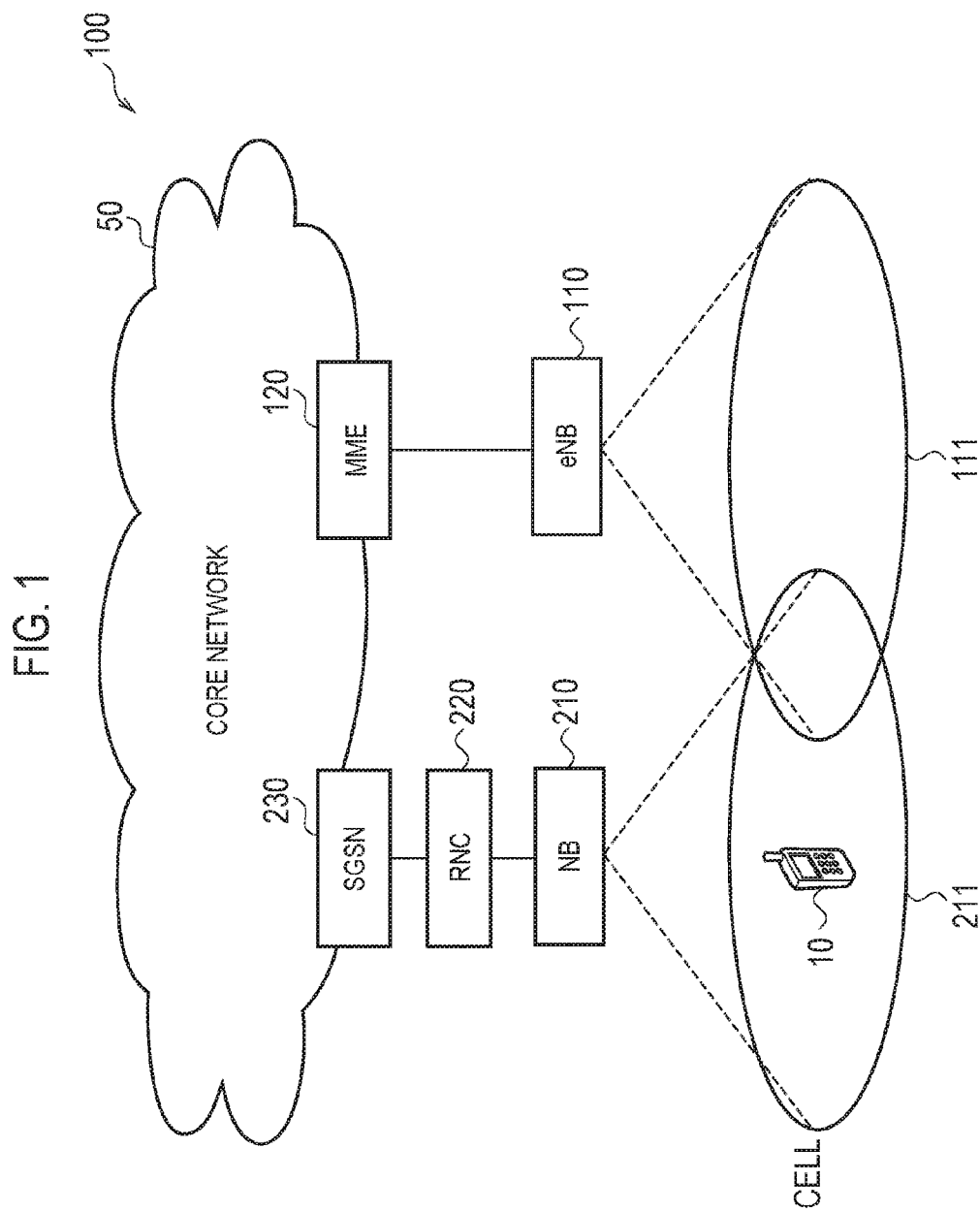
FIG. 1 is a diagram showing a mobile communication system 100 according to a first embodiment.

A mobile communication system according to a first embodiment will be described, below. FIG. 1 is a diagram showing a mobile communication system 100 according to the first embodiment.

As shown in FIG. 1, the mobile communication system 100 includes a radio terminal 10 (hereinafter, referred to as "UE 10") and a core network 50. Further, the mobile communication system 100 includes a first communication system and a second communication system. It is noted that the mobile communication system 100 is not limited to that which includes the first communication system and the second communication system, and may be that which includes the first communication system only, and may be that which includes the second communication system only, for example.

The first communication system, for example, is a communication system corresponding to LTE (Long Term Evolution). The first communication system, for example, has a radio base station 110 (hereinafter, referred to as "eNB 110") and an MME 120. It is noted that in the first communication system, a first RAT (EUTRAN; Evolved Universal Terrestrial Access Network) is used.

The second communication system, for example, is a WCDMA (Wideband Code Division Multiple Access)-compatible communication system. The second communication system has a radio base station 210 (hereinafter, referred to as "NB 210"), an RNC 220, and an SGSN 230. It is noted that in the second communication system, a second RAT (UT RAN; Universal Terrestrial Access Network) is used.

The UE 10 is a device (User Equipment) configured to communicate with the first communication system and the second communication system. For example, the UE 10 has a function of performing radio communication with the NB 210 as well as a function of performing radio communication with the eNB 110. It is noted that the UE 10 is not limited to a device; may be a communication module.

The eNB 110, having a cell 111, is a device (evolved NodeB) that performs radio communication with the UE 10 which is present in the cell 111.

The MME 120 is a device (Mobility Management Entity) that manages the mobility of the UE 10 having set a radio connection with the eNB 110. The MME 120 is provided in the core network 50.

The radio base station 210, having a cell 211, is a device (NodeB) that performs radio communication with the UE 10 which is present in the cell 211.

The RNC 220, connected to the radio base station 210, is a device (Radio Network Controller) that sets a radio connection (RRC Connection) with the UE 10 which is present in the cell 211.

The SGSN 230 is a device (Serving GPRS Support Node) that performs packet switching in a packet switching domain. The SGSN 230 is provided in the core network 50. Although not shown in FIG. 1, a device (MSC; Mobile Switching Center) that performs circuit switching in a circuit switching domain may be provided in the core network 50.

It is noted that the first communication system will be mainly described, below. However, the following description may also be applied to the second communication system. Further, a cell should be understood as a function of performing radio communication with the UE 10. However, the cell may also be considered as a service area indicating a range communicable with the cell.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Further, in the first communication system, an uplink channel includes an uplink control channel (PUCCH; Physical Uplink Control Channel), an uplink shared channel (PUSCH; Physical Uplink Shared Channel), and the like. Further, a downlink channel includes a downlink control channel (PDCCH; Physical Downlink Control Channel), a downlink shared channel (PDSCH; Physical Downlink Shared Channel), a broadcast channel (PBCH: Physical Broadcast Channel), and the like.

The uplink control channel is a channel that carries a control signal. The control signal, for example, includes CQI (Channel Quality Indicator), PMI (Precoding Matrix Indicator), RI (Rank Indicator), SR (Scheduling Request), ACK/NACK, and the like.

The CQI is a signal that notifies a recommended modulation scheme and an encoding rate to be used in downlink transmission. The PMI is a signal indicating a precoder matrix which is preferably used for the downlink transmission. The RI is a signal indicating the number of layers (the number of streams) to be used in the downlink transmission. The SR is a signal that requests an allocation of an uplink radio resource (a resource block which will be described later). The ACK/NACK is a signal indicating whether or not a signal transmitted via the downlink channel (for example, the PDSCH) has been successfully received.

The uplink shared channel is a channel that carries a control signal (including the above-mentioned control signal) and/or a data signal. For example, the uplink radio resource may be allocated only to the data signal, or allocated such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal indicating an allocation of the uplink radio resource. The Downlink SI is a signal indicating an allocation of a downlink radio resource. The TPC bit is a signal that indicates increase or decrease in the power of a signal transmitted via the uplink channel.

The downlink shared channel is a channel that carries a control signal and/or a data signal. For example, a downlink radio resource may be allocated only to the data signal, or allocated such that the data signal and the control signal are multiplexed. The downlink channel carries an SIB (System Information Block), for example. Information transmitted through the downlink shared channel (the SIB, for example) includes a subframe number. The subframe number is a number changing for each unit time, and is a number to go around in a predetermined cycle.

It is noted that a control signal transmitted via the downlink shared channel includes TA (Timing Advance). The TA is transmission timing correction information between the UE 10 and the eNB 110, and is measured by the eNB 110 on the basis of an uplink signal transmitted from the UE 10.

Further, a control signal transmitted via a channel, other than the downlink control channel (PDCCH) and the downlink shared channel (the PDSCH), includes the ACK/NACK. The ACK/NACK is a signal indicating whether or not a signal transmitted via the uplink channel (for example, the PUSCH) has been successfully received.

The broadcast channel carries an MIB (Master Information Block). The MIB includes a system frame number (SFN). The system frame number is a number changing for each unit time, and is a number to go around in a predetermined cycle.

(Radio Frame)

Figure 2:
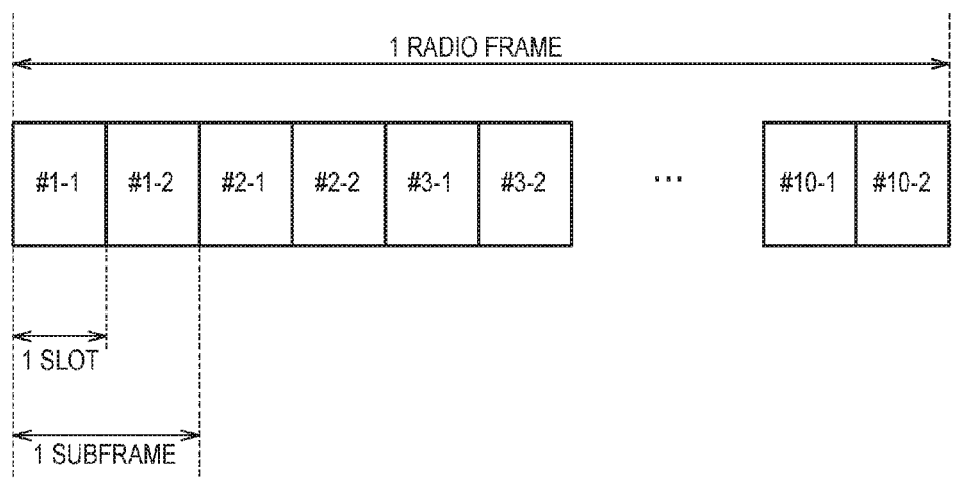
FIG. 2 is a diagram showing a radio frame according to the first embodiment.

A radio frame in the first communication system will be described, below. FIG. 2 is a diagram showing the radio frame in the first communication system.

As shown in FIG. 2, one radio frame is configured by 10 subframes and one subframe is configured by two slots. One slot has a time length of 0.5 msec, one subframe has a time length of 1 msec, and one radio frame has a time length of 10 msec.

It is noted that one slot is configured by a plurality of OFDM symbols (for example, six OFDM symbols or seven OFDM symbols) in a downlink direction. Similarly, one slot is configured by a plurality of SC-FDMA symbols (for example, six SC-FDMA symbols or seven SC-FDMA symbols) in an uplink direction.

(Radio Resource)

Figure 3:
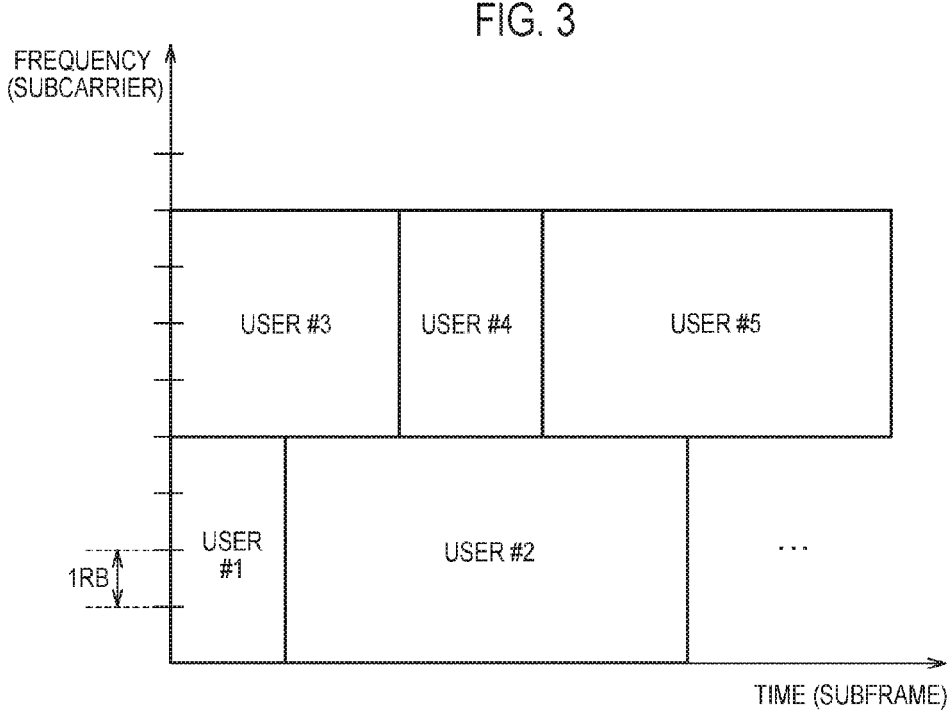
FIG. 3 is a diagram showing a radio resource according to the first embodiment.

A radio resource in the first communication system will be described, below. FIG. 3 is a diagram showing the radio resource in the first communication system.

As shown in FIG. 3, the radio resource is defined by a frequency axis and a time axis. A frequency is configured by a plurality of subcarriers, and a predetermined number of subcarriers (12 subcarriers) are collectively called a resource block (RB). As described above, a time has a unit, such as the OFDM symbol (or the SC-FDMA symbol), the slot, the subframe, and the radio frame.

Here, the radio resource is allocatable to each one resource block. Further, on the frequency axis and the time axis, it is possible to divide and allocate the radio resources to a plurality of users (for example, a user #1 to a user #5).

Further, the radio resource is allocated by the eNB 110. The eNB 110 is allocated to each UE 10 on the basis of the CQI, the PMI, the RI, and the like.

(Discontinuous Reception)

Figure 4:
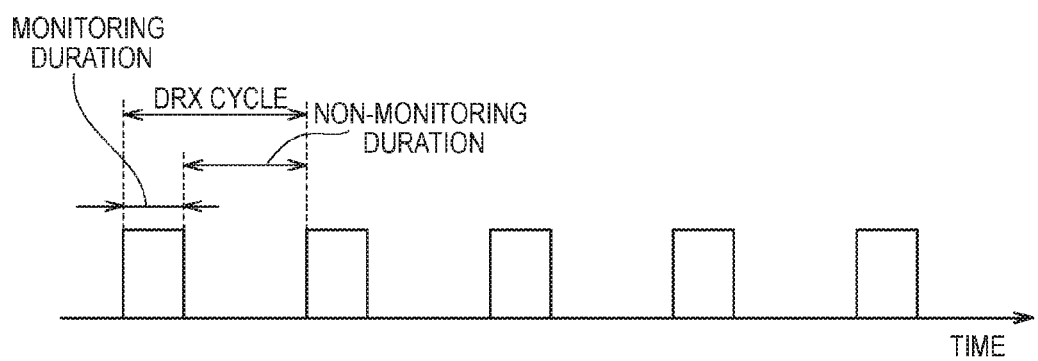
FIG. 4 is a diagram showing a DRX according to the first embodiment.

A discontinuous reception (DRX) will be described, below. FIG. 4 is a diagram for describing the discontinuous reception. In a stand-by state (Idle state), the UE 10 is capable of setting the discontinuous reception in order to restrain the power consumption. Here, the eNB 110 is exemplified as a radio base station, however, the embodiment is not limited thereto. The radio base station may be the radio base station 210.

As shown in FIG. 4, the DRX cycle has a monitoring duration in which the UE 10 monitors a downlink signal and a non-monitoring duration in which the UE 10 does not monitor a downlink signal. The UE 10 monitors a downlink signal in the monitoring duration.

(Discontinuous Reception)

A discontinuous reception (DRX) will be described, below. FIG. 4 is a diagram for describing the discontinuous reception. In a stand-by state (Idle state), the UE 10 is capable of configuring the discontinuous reception in order to reduce the power consumption. Here, the eNB 110 is exemplified as a radio base station, however, the embodiment is not limited thereto. The radio base station may be the radio base station 210.

As shown in FIG. 4, the DRX cycle has a monitoring duration in which the UE 10 monitors a downlink signal and a non-monitoring duration in which the UE 10 does not monitor a downlink signal. The UE 10 monitors a downlink signal in the monitoring duration.

(Radio Terminal)

Figure 5:
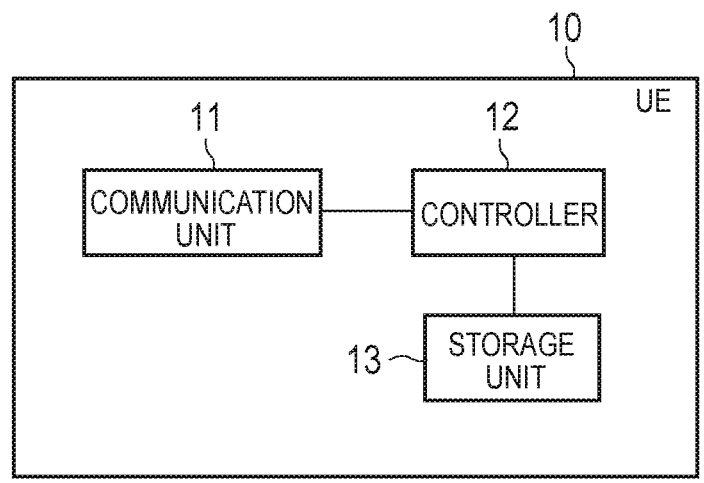
FIG. 5 is a block diagram showing a UE 10 according to the first embodiment.

A radio terminal according to the first embodiment will be described, below. FIG. 5 is a block diagram showing the UE 10 according to the first embodiment. As shown in FIG. 5, the UE 10 has a communication unit 11, a controller 12, and a storage unit 13.

The communication unit 11 receives a downlink signal from the eNB 110 (or the radio base station 210). Alternatively, the communication unit 11 transmits an uplink signal to the eNB 110 (or the radio base station 210). It is noted that the communication unit 11 has, for example, an antenna (a plurality of antennas when MIMO is used), a demodulation unit, and a modulation unit.

In the first embodiment, the communication unit 11 notifies the eNB 110 in which the UE 10 exits, of information for designating a paging cycle allocated with an opportunity in which a paging signal is transmitted. The information for designating the paging cycle may be transmitted via the above-described uplink control channel (PUCCH), and may be transmitted via the uplink shared channel (PUSCH). Here, the paging cycle denotes a cycle in which the eNB 110 transmits the paging signal or a cycle in which a communication unit is activated in order that the UE 10 receives (monitors) the paging signal transmitted from the eNB 110.

In such a case, the information for designating the paging cycle may be a relative value with respect to the current paging cycle. When a kind of the paging cycle (0.32 seconds, 0.64 seconds, 1.28 seconds, or 2.56 seconds, for example) is defined, a relative value may be the number of stages that should not be increased or decreased with respect to the current paging cycle. Alternatively, the relative value may be the number of seconds that should be increased or decreased with respect to the current paging cycle.

Alternatively, the information for designating the paging cycle may be an absolute value to specify the paging cycle. When a kind of the paging cycle (0.32 seconds, 0.64 seconds, 1.28 seconds, or 2.56 seconds, for example) is defined, the absolute value may be an index assigned to the paging cycle. Alternatively, the absolute value may be the number of seconds of the paging cycle.

Alternatively, the communication unit 11 may receive the information for designating the paging cycle, from the eNB 110 in which the UE 10 exists. The information for designating the paging cycle may be received via the downlink control channel (PDCCH), and may be received via the downlink shared channel (PDSCH).

In the first embodiment, the paging cycle may be considered synonymously with the DRX cycle configured by the UE 10.

The controller 12 controls the UE 10. For example, when being set to execute a discontinuous reception (DRX), the controller 12 sets, on the basis of the paging cycle stored in the storage unit 13, the monitoring duration and the non-monitoring duration. More particularly, when the controller 12 turns on (activates) the communication unit 11 in the monitoring duration in which the downlink signal is monitored, such that the communication unit 11 receives the downlink signal (the PDCCH, for example) transmitted from the eNB 110 to monitor the downlink signal (the PDCCH, for example) transmitted from the eNB 110. When the controller 12 turns off (sets to sleep) the communication unit 11 in the non-monitoring duration in which the downlink signal is not monitored such that the communication unit 11 does not receive the downlink signal (the PDCCH, for example) transmitted from the eNB 110 not to monitor the downlink signal (the PDCCH, for example) transmitted from the eNB 110.

The storage unit 13 stores the paging cycle of the UE 10.

(Radio Base Station)

Figure 6:
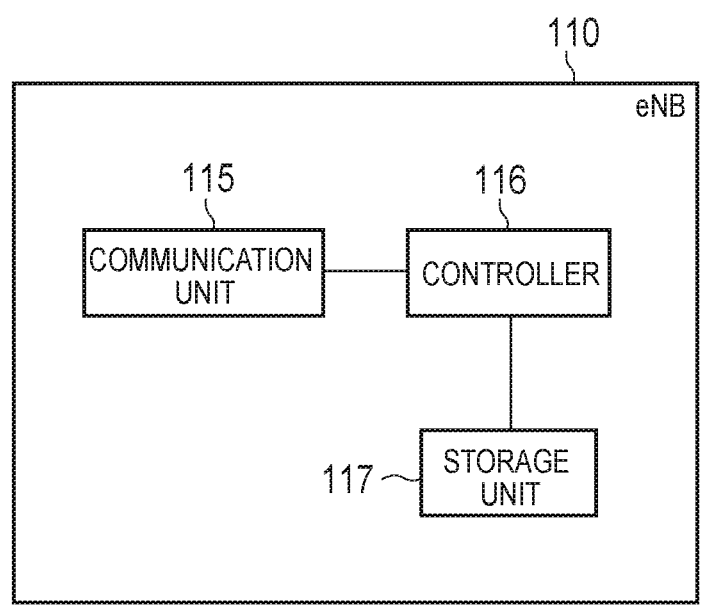
FIG. 6 is a block diagram showing an eNB 110 according to the first embodiment.

The radio base station according to the first embodiment will be described, below. Here, the eNB 110 is exemplified as a radio base station, however, the embodiment is not limited thereto. The radio base station may be the radio base station 210. FIG. 6 is a block diagram showing the eNB 110 according to the first embodiment. As shown in FIG. 6, the eNB 110 has a communication unit 115, a controller 116, and a storage unit 117.

The communication unit 115 receives an uplink signal from the UE 10. Alternatively, the communication unit 115 transmits a downlink signal to the UE 10. It is noted that, the communication unit 115 has, for example, an antenna, a demodulation unit, and a modulation unit.

In the first embodiment, the communication unit 115 receives the information for designating the paging cycle from the UE 10 that is present in an area covered by the eNB 110. As described above, the information for designating the paging cycle may be received via the uplink control channel (PUCCH), and may be received via the uplink shared channel (PUSCH).

Alternatively, the communication unit 115 may notify the UE 10 that is present in an area covered by the eNB 110, of the information for designating the paging cycle. The information for designating the paging cycle may be transmitted, as described above, via the downlink control channel (PDCCH), and may be transmitted via the downlink shared channel (PDSCH). For example, the information for designating the paging cycle is included in an SIB2, that is a kind of the SIB, and may be broadcast to all the UEs 10 that are present in an area covered by the eNB 110.

In such a case, the information for designating the paging cycle preferably is an absolute value of the paging cycle. As a result, the paging cycle comprehended by the UE 10 and the paging cycle comprehended by the eNB 110 are synchronizable.

The controller 116 controls the eNB 110. For example, the controller 116 allocates a resource for the UE 10 to transmit an uplink signal or a resource for the UE 10 to receive an uplink signal.

In the first embodiment, the controller 116 allocates, as a paging cycle allocated with an opportunity in which a paging signal is transmitted, a different paging cycle, to each UE 10 that is present in an area covered by the eNB 110.

Here, the controller 116 preferably registers the paging cycle allocated to the UE 10 that is present in an area covered by the eNB 110, into a table stored in the storage unit 117.

The controller 116 controls so that the communication unit 115 transmits the paging signal destined to the UE 10 that is present in an area covered by the eNB 110 in a smallest paging cycle. The smallest paging cycle is the shortest paging cycle, out of the paging cycles stored in the storage unit 117 (that is, the paging cycles allocated to UEs 10 that are present in an area covered by the eNB 110).

When receiving a paging response in response to the paging signal, the controller 116 controls so that the communication unit 115 stops repetition of the transmission of the paging signal.

The storage unit 117 stores a table in which the UE 10 that is present in an area covered by the eNB 110 and the paging cycle allocated to the UE 10 are associated. The paging cycle allocated to the UE 10 that is present in an area covered by the eNB 110 is registered, by the controller 116, into the storage unit 117, as described above.

(Mobile Communication Method)

Figure 7:
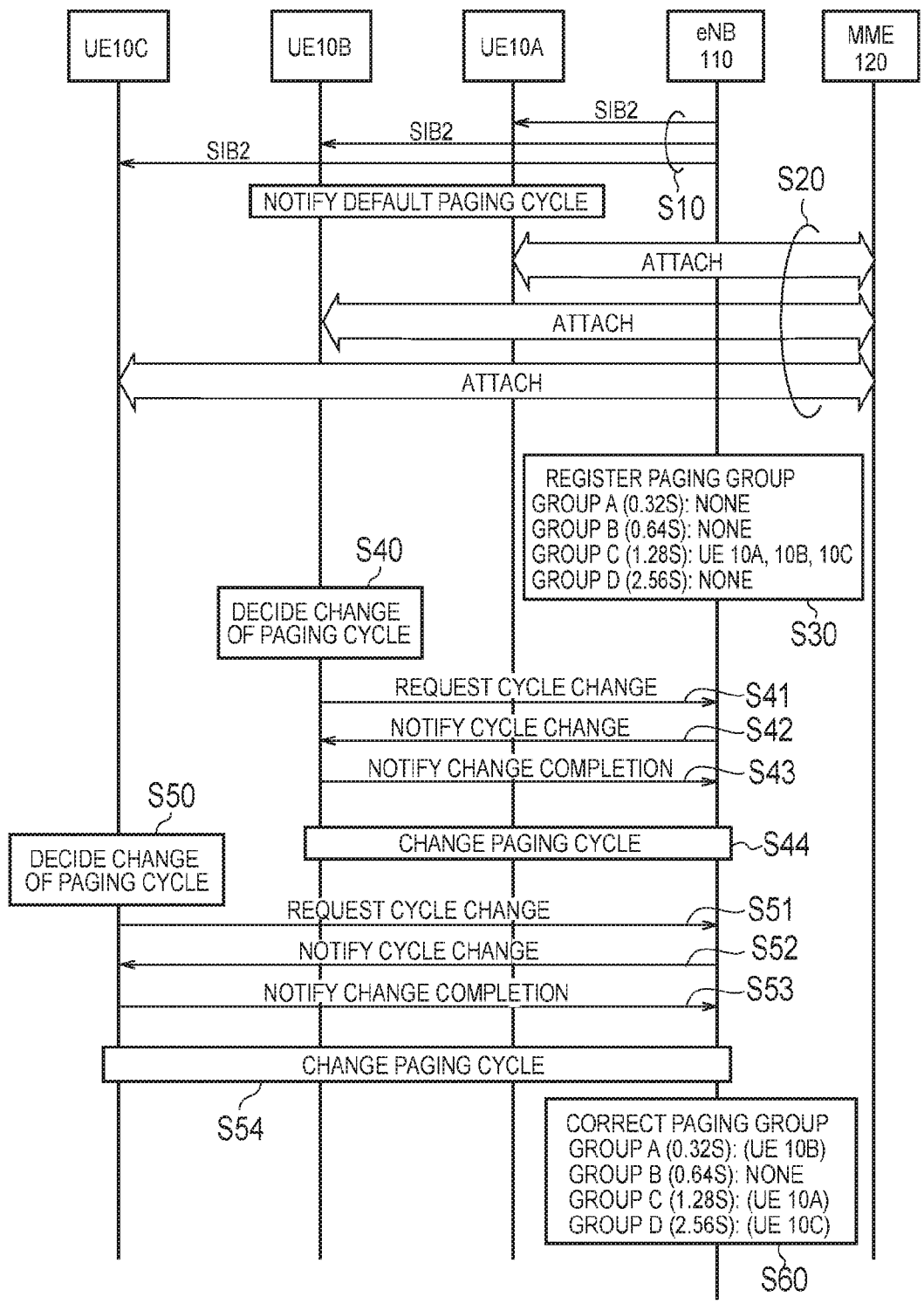
FIG. 7 is a sequence diagram showing a mobile communication method according to the first embodiment.
Figure 8:
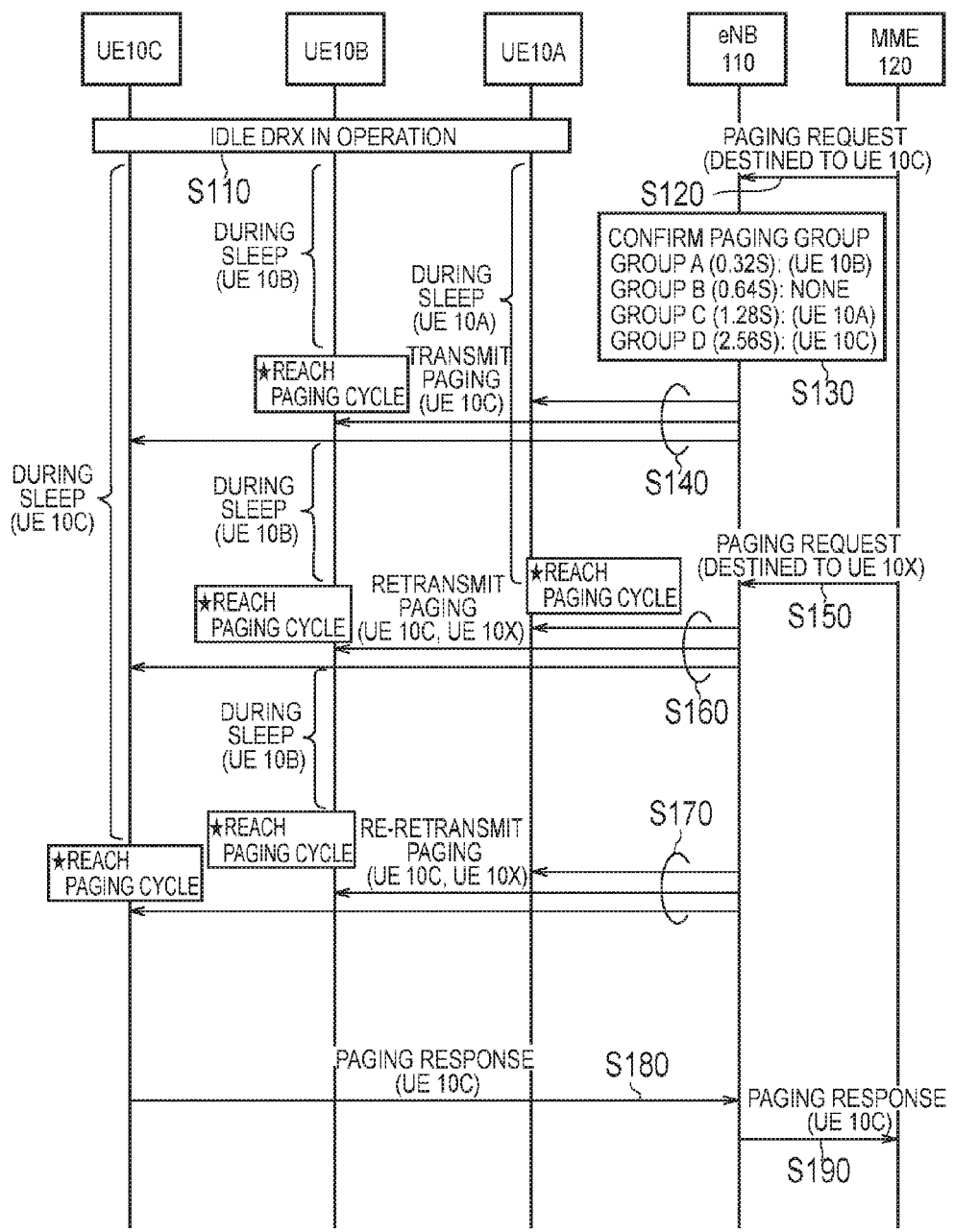
FIG. 8 is a sequence diagram showing a mobile communication method according to the first embodiment.

A mobile communication method according to the first embodiment will be described, below. FIG. 7 and FIG. 8 are sequence diagrams showing the mobile communication method according to the first embodiment. Here, the eNB 110 is exemplified as a radio base station, however, the embodiment is not limited thereto. The radio base station may be the radio base station 210.

A case is described where as a paging cycle, four kinds of the paging cycle (0.32 seconds, 0.64 seconds, 1.28 seconds, and 2.56 seconds) are defined, below. Further, a case is described where in the cell managed by the eNB 110, as the default paging cycle, 1.28 seconds is used. A UE 10A is a standard UE 10, a UE 10B is a UE 10 assumed to have a highly frequent incoming call, and a UE 10C is a UE 10 assumed to have a lowly frequent incoming call.

Firstly, a process of changing the paging cycle will be described with reference to FIG. 7.

As shown in FIG. 7, in step S10, the eNB 110 notifies a UE 10 that is present in an area covered by the eNB 110, of the information for designating the paging cycle. Here, the information for designating the paging cycle is included in the SIB2, that is a kind of the SIB, and is broadcast to all the UEs 10 (here, the UE 10A, the UE 10B, and the UE 10C) that are present in an area covered by the eNB 110. Here, the paging cycle included in the notified information for designating the paging cycle is a paging cycle (default paging cycle) previously stored, as a standard paging cycle to all the UE 10, in the eNB 110, for example.

In step S20, between the UE 10 (here, the UE 10A, the UE 10B, and the UE 10C) and the MME 120 (eNB 110), an Attach process is performed. As a result, a process of registering the location of the UE 10 is performed.

In step S30, the eNB 110 registers, in a table stored in the storage unit 117, the paging cycle allocated to the UE 10 (here, the UE 10A, the UE 10B, and the UE 10C) that are present in an area covered by the eNB 110. As a result, the storage unit 117 stores a table in which the UE 10 that is present in an area covered by the eNB 110 and the paging cycle allocated to the UE 10 are associated. Here, four groups are arranged for each paging cycle, and the UE 10 that is present in an area covered by the eNB 110 is categorized into any one of the four groups.

In step S40, the UE 10B decides a change of the paging cycle. Here, the UE 10B decides to halve the paging cycle. A method of deciding to change the paging cycle may be decided on the basis of the paging cycle previously stored in the UE 10B, and may be decided on the basis of the paging cycle input by a user operation.

In step S41, the UE 10B notifies the eNB 110 of the information for designating the paging cycle (cycle change request). As described above, the cycle change request may be a relative value with respect to the current paging cycle, and may be an absolute value to specify the paging cycle.

In step S42, the eNB 110 determines whether or not to permit the change of the paging cycle of the UE 10B. Here, description proceeds with an assumption that it is determined that the change of the paging cycle of the UE 10B is permitted. Therefore, the eNB 110 transmits, to the UE 10B, information indicating that the change of the paging cycle of the UE 10B (cycle change notification) is permitted.

In step S43, the UE 10B notifies the eNB 110 of the information indicating that the change of the paging cycle is complete (cycle completion notification).

In step S44, the UE 10B and the eNB 110 change the paging cycle of the UE 10B. That is, the eNB 110 registers the changed paging cycle of the UE 10B into the table stored in the storage unit 117, and the UE 10B stores the changed paging cycle of the UE 10B, into the storage unit 13. Thus, the eNB 110 transmits the paging signal destined to the UE 10B in a cycle not longer than the changed paging cycle of the UE 10B and the UE 10B activates the communication unit 11 by the changed paging cycle of the UE 10B, and as a result, the UE 10B is capable of promptly receiving the paging signal.

In step S50, the UE 10C decides the change of the paging cycle. Here, the UE 10C decides to double the paging cycle from the current paging cycle (default paging cycle). A method of deciding to change the paging cycle may be decided on the basis of the paging cycle previously stored in the UE 10C, and may be decided on the basis of the paging cycle input by a user operation.

In step S51, the UE 10C notifies the eNB 110 of the information for designating the paging cycle (cycle change request). As described above, the cycle change request may be a relative value with respect to the current paging cycle, and may be an absolute value to specify the paging cycle.

In step S52, the eNB 110 determines whether or not to permit the change of the paging cycle of the UE 10C. Here, description proceeds with an assumption that it is determined that the change of the paging cycle of the UE 10C is permitted. Therefore, the eNB 110 transmits, to the UE 10C, information indicating that the change of the paging cycle of the UE 10C (cycle change notification) is permitted.

In step S53, the UE 10C notifies the eNB 110 of the information indicating that the change of the paging cycle is complete (cycle completion notification).

In step S54, the UE 10C and the eNB 110 change the paging cycle of the UE 10C. That is, the eNB 110 registers the changed paging cycle of the UE 10C into the table stored in the storage unit 117, and the UE 10C stores the changed paging cycle of the UE 10C, into the storage unit 13. Thus, the eNB 110 transmits the paging signal destined to the UE 10C in a cycle not longer than the changed paging cycle of the UE 10C and the UE 10C activates the communication unit 11 by the changed paging cycle of the UE 10C, and as a result, the UE 10C is capable of promptly receiving the paging signal.

In step S60, the eNB 110 registers the paging cycle allocated to the UE 10B and the UE 10C, into the table stored in the storage unit 117.

Secondly, the transmission of the paging signal will be described with reference to FIG. 8. Here, a case will be described, as an example, in which a paging request destined to the UE 10C that are present in an area covered by the eNB 110 and a paging request destined to an UE 10X not that are present in an area covered by the eNB 110 are received by the eNB 110.

In step S110, the UE 10A, the UE 10B, and the UE 10C implement the discontinuous reception in the DRX cycle, in a stand-by state (Idle state).

In step S120, the eNB 110 receives the paging request destined to the UE 10 that is present in an area covered by the eNB 110, from the MME 120.

In step S130, the eNB 110 confirms the table stored in the storage unit 117. That is, the eNB 110 confirms the paging cycle allocated to the UE 10 that is present in an area covered by the eNB 110 (here, the UE 10A, the UE 10B, and the UE 10C).

Here, the eNB 110 decides to transmit the paging signal destined to the UE 10 that is present in an area covered by the eNB 110 in a smallest paging cycle. The smallest paging cycle is the shortest paging cycle, out of the paging cycles stored in the storage unit 117 (that is, the paging cycles allocated to UEs 10 that are present in an area covered by the eNB 110). Here, the smallest paging cycle is 0.32 seconds.

In step S140, the eNB 110 broadcasts (transmits) the paging signal destined to the UE 10C. Here, the UE 10B reaches the paging cycle allocated to the UE 10B (the smallest paging cycle), and thus, activates the communication unit 11 so as to receive, in the monitoring duration, the paging signal destined to the UE 10C. However, the paging signal is not destined to the UE 10B, and thus, the UE 10B deletes the received paging signal destined to the UE 10C.

In step S150, the eNB 110 receives the paging request destined to the UE 10X that is not present in an area covered by the eNB 110, from the MME 120.

In step S160, the eNB 110 broadcasts (retransmits) the paging signal destined to the UE 10C, and broadcasts (transmits) the paging signal destined to the UE 10X. Here, the UE 10A reaches the paging cycle allocated to the UE 10A (default paging cycle) and the UE 10B reaches the paging cycle allocated to the UE 10B (smallest paging cycle), and thus, the UE 10A and the UE 10B activate the communication unit 11 to receive, in the monitoring duration, the paging signal destined to the UE 10C and the paging signal destined to the UE 10X. However, the paging signal is not destined to the UE 10A and the UE 10B, and thus, the UE 10A and the UE 10B delete the received paging signal destined to the UE 10C and the paging signal destined to the UE 10X.

Here, it should be noted that a paging area includes a cell managed by another eNB 110, and thus, the eNB 110 needs to broadcast also the paging signal destined to the UE 10X.

In step S170, the eNB 110 broadcasts (re-retransmits) the paging signal destined to the UE 10C, and broadcasts (retransmits) the paging signal destined to the UE 10X. Here, the UE 10B reaches the paging cycle allocated to the UE 10B (smallest paging cycle) and the UE 10C reaches the paging cycle allocated to the UE 10C (largest paging cycle), and thus, the UE 10B and the UE 10C activate the communication unit 11 to receive, in the monitoring duration, the paging signal destined to the UE 10C and the paging signal destined to the UE 10X. The paging signal is not destined to the UE 10B, and thus, the UE 10B deletes the received paging signal destined to the UE 10C and the paging signal destined to the UE 10X. On the other hand, the UE 10C does not delete the received paging signal destined to the UE 10C, and deletes only the received paging signal destined to the UE 10X.

In step S180, the UE 10C transmits a paging response to the eNB 110, in response to the paging signal destined to the UE 10C. The eNB 110 stops, in response to reception of the paging response, the repetition of the transmission of the paging signal destined to the UE 10C.

In step S190, the eNB 110 transmits the paging response received from the UE 10C, to the MME 120.

(Operation and Effect)

In the first embodiment, the eNB 110 allocates, as a paging cycle allocated with an opportunity in which a paging signal is transmitted, a different paging cycle, to each UE 10 that is present in an area covered by the eNB 110. In other words, there is no need of using the same DRX cycle (paging cycle) in a cell managed by the eNB 110, it is possible to sufficiently reduce a power consumption of the UE 10 having less opportunities in which a paging signal destined to the UE 10 is transmitted.

Further, it is possible to shorten the paging cycle for the UE 10 that desires to receive a paging signal in a paging cycle shorter than a default paging cycle defined in a cell managed by the eNB 110.

Other Embodiments

The present invention is described through the above-described embodiments, but it should not be understood that this invention is limited by the statements and the drawings constituting a part of this disclosure. From this disclosure, various alternative embodiments, examples, and operational technologies will become apparent to those skilled in the art.

In the embodiment, the paging cycle is changed by the trigger of the UE 10. However, the embodiment is not limited thereto. That is, the paging cycle may be changed by the trigger of the eNB 110.

In the embodiment, in step S42 or step S52, a case is shown, as an example, where the change of the paging cycle of the UE 10 is permitted. However, when it is determined that the change of the paging cycle of the UE 10 is not permitted, the eNB 110 may transmit information indicating that the change of the paging cycle is not permitted (cycle change rejection), to the UE 10.

Particularly not mentioned in the embodiment, when transition is made to the stand-by state (Idle state) again after the transition is made from the stand-by state (Idle state) to the connected state (Connected state), the changed paging cycle may be carried over.

Particularly not mentioned in the embodiment, an information element used in step S41 to step S43 (or step S41 to step S43) may be included in a message used in an RRC connection reestablishment procedure. That is, the change of the paging cycle may be performed in the RRC connection reestablishment procedure.

Characteristics of the above-described embodiment may be expressed as follows.

A first characteristic lies in a mobile communication method of configuring a DRX cycle having a monitoring duration in which a downlink signal is monitored and a non-monitoring duration in which the downlink signal is not monitored between a radio terminal and a radio base station, comprising: allocating, by the radio base station, as a paging cycle allocated with an opportunity in which a paging signal is transmitted, a different paging cycle, to each radio terminal that is present in an area covered by the radio base station.

In the first characteristic, the radio base station comprises: storing a table in which a radio terminal that is present in an area covered by the radio base station and the paging cycle allocated to the radio terminal are associated.

In the first characteristic, the mobile communication method comprises: notifying, from the radio terminal that is present in an area covered by the radio base station, the radio base station, of the information for designating the paging cycle.

In the first characteristic, the mobile communication method comprises: notifying, from the radio base station, the radio terminal that is present in an area covered by the radio base station, of the information for designating the paging cycle.

In the first characteristic, the mobile communication method comprises: transmitting, by the radio base station, a paging signal destined to the radio terminal that is present in an area covered by the radio base station, in a smallest paging cycle allocated to the radio terminal that is present in an area covered by the radio base station.

A second characteristic lies in a radio base station used in a mobile communication system that configures a DRX cycle having a monitoring duration in which a downlink signal is monitored and a non-monitoring duration in which the downlink signal is not monitored, comprising: a controller configured to allocate, as a paging cycle allocated with an opportunity in which a paging signal is transmitted, a different paging cycle, to each radio terminal that is present in an area covered by the radio base station.

It is noted that the entire content of Japanese Patent Application No. 2013-266172 (filed on Dec. 24, 2013) is incorporated in the present specification by reference.

INDUSTRIAL APPLICABILITY

According to the embodiment, it is possible to provide a mobile communication system and a radio base station with which it is possible to sufficiently reduce a power consumption of a radio terminal having less opportunities in which a paging signal destined to the radio terminal is transmitted.

The invention claimed is:

1. A mobile communication method in which a radio base station allocates a paging cycle that is a cycle in which a radio terminal monitors a paging signal transmitted from the radio base station, to a radio terminal that is present in an area covered by the radio base station, comprising:
    allocating, by the radio base station, respectively different paging cycles, to a plurality of radio terminals that are present in an area covered by the radio base station;
    selecting, by the base station, a first paging cycle that is the shortest paging cycle among the respectively different paging cycles allocated to each of the plurality of radio terminals; and
    broadcasting, by the radio base station, a paging signal with the first paging cycle.

2. The mobile communication method according to claim 1, further comprising:
    storing, by the radio base station, a table in which the plurality of radio terminals and the paging cycle allocated to each of the plurality of radio terminals are associated.

3. The mobile communication method according to claim 1, further comprising:
    notifying, by the radio base station, a radio terminal that is present in an area covered by the radio base station, of information for designating the paging cycle.

4. The mobile communication method according to claim 1, wherein
    in the broadcasting step, information addressed to a radio terminal allocated with a paging cycle other than the smallest paging cycle is included in the paging signal.

5. A mobile communication method in which a radio base station allocates a paging cycle that is a cycle in which a radio terminal monitors a paging signal transmitted from the radio base station, to a radio terminal that is present in an area covered by the radio base station, comprising:
    allocating, by the radio base station, a predetermined paging cycle, to a plurality of radio terminals that are present in an area covered by the radio base station;
    notifying, by at least one radio terminal out of the plurality of radio terminals, the radio base station, of information for designating a specific paging cycle, the specific paging cycle being different from the predetermined paging cycle; and
    allocating, by the radio base station, the specific paging cycle, to the at least one radio terminal.

6. A radio base station that allocates a paging cycle that is a cycle in which a radio terminal monitors a paging signal transmitted from the radio base station, to a radio terminal that is present in an area covered by the radio base station, comprising:
- a controller configured to allocate respectively different paging cycles, to a plurality of radio terminals that are present in an area covered by the radio base station, wherein
- the controller is further configured to:
- select a first paging cycle that is the shortest paging cycle among the respectively different paging cycles allocated to each of the plurality of radio terminals; and
- broadcast a paging signal with the first paging cycle.

* * * * *